US012442321B2

(12) United States Patent
Haft et al.

(10) Patent No.: US 12,442,321 B2
(45) Date of Patent: Oct. 14, 2025

(54) METHOD AND DEVICE FOR DIAGNOSING A LEAKAGE OF A CRANKCASE VENTILATION LINE OF A CRANKCASE VENTILATION DEVICE FOR AN INTERNAL COMBUSTION ENGINE

(71) Applicant: Vitesco Technologies GmbH, Regensburg (DE)

(72) Inventors: Gerhard Haft, Maxhütte-Haidhof (DE); Carsten Bruns, Regensburg (DE); Thomas Czarnecki, Sinsheim (DE); Karl Gruenbeck, Kelheim (DE)

(73) Assignee: Vitesco Technologies GmbH, Regensburg (DE)

( * ) Notice: Subject to any disclaimer, the term of this patent is extended or adjusted under 35 U.S.C. 154(b) by 421 days.

(21) Appl. No.: 17/651,142

(22) Filed: Feb. 15, 2022

(65) Prior Publication Data

US 2022/0170396 A1 Jun. 2, 2022

Related U.S. Application Data

(63) Continuation of application No. PCT/EP2020/073064, filed on Aug. 18, 2020.

(30) Foreign Application Priority Data

Aug. 21, 2019 (DE) .................. 10 2019 212 457.7

(51) Int. Cl.
  *F01M 13/02* (2006.01)
  *F01M 13/04* (2006.01)
  *F02D 41/22* (2006.01)

(52) U.S. Cl.
  CPC .......... *F01M 13/022* (2013.01); *F01M 13/04* (2013.01); *F02D 41/22* (2013.01); *F01M 2013/027* (2013.01); *F02D 2250/08* (2013.01)

(58) Field of Classification Search
  CPC ................ F01M 13/022; F01M 13/04; F01M 2013/027; F02D 41/22; F02D 2250/08
  See application file for complete search history.

(56) References Cited

U.S. PATENT DOCUMENTS

2005/0022795 A1  2/2005  Beyer
2008/0201062 A1  8/2008  Herz
(Continued)

FOREIGN PATENT DOCUMENTS

CN  1179736 A  4/1998
CN  1343831 A  4/2002
(Continued)

OTHER PUBLICATIONS

Machine Translation of KR 20120123134 A PDF File Name: "KR20120123134A_Machine_Translation.pdf".*
(Continued)

*Primary Examiner* — Lindsay M Low
*Assistant Examiner* — Ruben Picon-Feliciano

(57) ABSTRACT

The disclosure relates to a method for leakage diagnosis. The method includes influencing the introduction of gas along a crankcase aeration line into a crankcase of an internal combustion engine and acquiring a measurement signal profile by an exhaust-gas sensor arranged in an exhaust-gas tract of an internal combustion engine. The measurement signal profile is characteristic of at least one exhaust-gas property of the exhaust gas. The method includes providing an expected measurement signal profile which is characteristic of the exhaust-gas property of the exhaust gas in the exhaust-gas tract based on the influence on the introduction of gas into the crankcase. Additionally, the method includes comparing the acquired measurement signal profile with the expected measurement signal profile and identifying that the crankcase ventilation line has a leak if, during the comparison, the acquired measurement signal (Continued)

profile deviates from the expected measurement signal profile by a predetermined threshold value.

12 Claims, 3 Drawing Sheets

(56) References Cited

U.S. PATENT DOCUMENTS

| | | | |
|---|---|---|---|
| 2011/0146391 A1 | 6/2011 | Olaf et al. | |
| 2012/0197550 A1* | 8/2012 | Cianflone | ............ F02D 41/18 702/45 |
| 2013/0228006 A1 | 9/2013 | Kuhn et al. | |
| 2016/0195449 A1 | 7/2016 | Biebl | |
| 2017/0002756 A1 | 1/2017 | Yudanov | |
| 2019/0226368 A1 | 7/2019 | Hofmann | |
| 2020/0291884 A1 | 9/2020 | Hong | |

FOREIGN PATENT DOCUMENTS

| | | | | |
|---|---|---|---|---|
| CN | 105593480 A | 5/2016 | | |
| CN | 106062328 A | 10/2016 | | |
| DE | 10101257 A1 * | 7/2001 | ......... | F02M 25/0809 |
| DE | 102008002721 A1 * | 12/2009 | ............ | F01M 13/00 |
| DE | 102009059662 A1 | 6/2011 | | |
| DE | 102013224030 A1 * | 5/2015 | ............ | F01M 13/00 |
| DE | 102013225388 A1 | 6/2015 | | |
| DE | 102015007513 A1 | 12/2016 | | |
| DE | 102015009505 A1 | 1/2017 | | |
| DE | 102016222117 A1 | 5/2018 | | |
| DE | 102017220257 A1 | 5/2019 | | |
| JP | S5044567 A | 4/1975 | | |
| KR | 20120123134 A * | 11/2012 | ......... | F02D 41/1454 |
| KR | 20190039319 A | 4/2019 | | |
| WO | 2012034907 A1 | 3/2012 | | |
| WO | 2019096568 A1 | 5/2019 | | |

OTHER PUBLICATIONS

Machine Translation of DE10101257A1 PDF File Name: "DE10101257A1_Machine_Translation.pdf".*
Machine Translation of DE-102008002721-A1 Pdf File Name: "DE102008002721A1_Machine_Translation.pdf" (Year: 2009).*
Machine Translation of DE-102013224030-A1 Pdf File Name: "DE102013224030A1_Machine_Translation.pdf" (Year: 2015).*
International Search Report and Written Opinion dated Nov. 13, 2020 from corresponding International Patent Application No. PCT/EP2020/073064.
German Office Action dated May 14, 2020 for corresponding German Patent Application No. 10 2019 212 457.7.
Korean Notice of Allowance dated Oct. 11, 2023 for corresponding Korean Patent Application No. 10-2022-7004008.
Chinese Office Action dated Nov. 30, 2023 corresponding Patent Application No. 202080059052.X.

* cited by examiner

METHOD AND DEVICE FOR DIAGNOSING A LEAKAGE OF A CRANKCASE VENTILATION LINE OF A CRANKCASE VENTILATION DEVICE FOR AN INTERNAL COMBUSTION ENGINE

CROSS-REFERENCE TO RELATED APPLICATIONS

This application claims the benefit of PCT Application PCT/EP2020/073064, filed Aug. 18, 2020, which claims priority to German Application 10 2019 212 457.7, filed Aug. 21, 2019. The disclosures of the above applications are incorporated herein by reference.

TECHNICAL FIELD

The disclosure relates to a method and a device for leakage diagnosis of a crankcase ventilation line of a crankcase ventilation device for an internal combustion engine.

BACKGROUND

After a cold start of an internal combustion engine, unburned fuel can be dissolved in a lubricant of the internal combustion engine, the fuel evaporates again as operating temperatures rise. For example, in reciprocating-piston internal combustion engines operating in accordance with the Otto principle or diesel principle, fuel can condense on the oil film on the cold wall of the combustion chamber, and dissolve in the oil film, in particular in the initial seconds after a cold start. This problem occurs above all in the case of a direct injection of the fuel into the combustion chamber, and in particular in Otto-cycle engines, but also in the case of other methods of fuel supply and in other internal combustion engines.

The dissolution of fuel and lubricant causes an undesirable change in the lubrication properties of the lubricant. This can increase wear and the likelihood of a defect occurring, and the expected service life of the internal combustion engine can be reduced as a result. The fuel dissolved in the lubricant evaporates again as the operating temperature rises, and, in a reciprocating-piston internal combustion engine, collects in the crankcase. Since the crankcase forms a closed chamber, the pressure therein would constantly rise without ventilation of the crankcase. The crankcase, often also referred to as engine case, is therefore connected to the intake tract by a crankcase ventilation line. Due to a pressure drop from the crankcase to the intake tract, a mass flow from the crankcase into the intake tract is generated in a manner dependent on the operating state of the internal combustion engine. This mass flow includes products of complete and incomplete combustion (exhaust gas or inert gas) which, as so-called "blowby gas", pass from the combustion chamber into the crankcase past the sealing rings of the pistons. Furthermore, the mass flow includes air which flows into the crankcase via a ventilation line. In addition, the mass flow may include soot, lubricating oil in the form of extremely small droplets, and hydrocarbons (fuel) that evaporate from the lubricant in the crankcase. Aside from the pressure drop in the crankcase, this also ensures that no unburned fuel enters the environment.

Since fuel vapors can enter the environment in the event of leakage of components of a crankcase ventilation device, legislation in some countries, in particular the CARB in the USA, stipulates that the crankcase ventilation device must be monitored with regard to its leak-tightness onboard, that is to say, during operation of the vehicle. In particular, it is necessary to identify if a line conducting crankcase gases is cut off or, within the crankcase ventilation device as a whole, there is a leak whose diameter is equal to or greater than the smallest diameter of a line conducting the crankcase gases.

A method is known for diagnosis of line systems, in particular of crankcase ventilation systems of internal combustion engines, in which a corrective value for an operating parameter of the internal combustion engine is formed in each of at least two temporally successive determination steps. The corrective values or values derived therefrom are used as evidence of a defect in the line system. The determination steps may here each be performed in an idling phase of the internal combustion engine.

Another method is known for testing the function of a ventilation device for the ventilation of a crankcase of an internal combustion engine, where the crankcase is connected to an air supply system of the internal combustion engine via the ventilation device.

SUMMARY

The disclosure provides a method or a device with which leakage diagnosis of a crankcase ventilation line of an internal combustion engine is performed in a simple and reliable manner.

One aspect of the disclosure provides a method for leakage diagnosis of a crankcase ventilation line of a crankcase ventilation device for an internal combustion engine has the steps listed below. The internal combustion engine has an intake tract which is configured to supply air to the internal combustion engine, an exhaust-gas tract which is configured to discharge exhaust gas from the internal combustion engine, a crankcase which is to be ventilated, and a crankcase ventilation device. The crankcase ventilation device is configured to supply gases from the crankcase to the intake tract for the purposes of ventilating the crankcase. The crankcase ventilation device accordingly has a crankcase ventilation line which supplies the gases that collect within the crankcase to the intake tract of the internal combustion engine. The crankcase ventilation device additionally has a crankcase aeration line which is configured to introduce gases, for example fresh air, from the outside into the crankcase, and accordingly to aerate the crankcase. For leakage diagnosis in accordance, the introduction of gas along the crankcase aeration line into the crankcase is firstly influenced. During the normal operation of the internal combustion engine, gas or fresh air flows continuously into the crankcase along the crankcase aeration line. The influencing of the introduction of gas according includes influencing, for example, the gas mass flow or the gas composition of the gas flowing into the crankcase, or completely stopping the gas mass flow.

Implementations of the disclosure may include one or more of the following optional features. In some implementations, a measurement signal profile is subsequently acquired by an exhaust-gas sensor which is arranged in the exhaust-gas tract of the internal combustion engine. The exhaust-gas sensor may be arranged directly downstream of the combustion chambers of the internal combustion engine on an exhaust manifold of the internal combustion engine, or further downstream, for example upstream of an exhaust-gas catalytic converter, downstream of the exhaust-gas catalytic converter or upstream of a particle filter or downstream of the particle filter. Here, the measurement signal profile of the exhaust-gas sensor is characteristic of at least one exhaust-gas property of the exhaust gas in the exhaust-gas tract, where the exhaust-gas property can be influenced by the influencing of the introduction of gas into the crankcase along the crankcase aeration line. In other words, the influence on the introduction of gas into the crankcase can be read from the measurement signal profile of the exhaust-gas sensor, for example with a time delay. The influencing of the introduction of gas into the crankcase along the crankcase aeration line accordingly also influences the introduction of the gases from the crankcase into the intake tract through the crankcase ventilation line. This influencing of the introduction of gases into the intake tract in turn influences the combustion within the combustion chambers of the internal combustion engine, whereby, in turn, at least one of the exhaust-gas properties of the exhaust gas is influenced. This influencing of the exhaust gas can be determined from the measurement signal profile of the exhaust-gas sensor. The exhaust-gas properties are, for example, the exhaust-gas temperature, the exhaust-gas pressure or the chemical composition of the exhaust gas.

An expected measurement signal profile is characteristic of the exhaust-gas property of the exhaust gas in the exhaust-gas tract based on the influencing of the introduction of gas into the crankcase. The expected measurement signal profile depicts the expected measurement signal profile in the case of corresponding influencing of the introduction of gas into the crankcase. The expected measurement signal profile may be stored in a memory of a control unit of the internal combustion engine and accordingly used for the leakage diagnosis. In some examples, the acquired measurement signal profile is subsequently compared with the expected measurement signal profile for the leakage diagnosis of the crankcase ventilation line. It is identified that the crankcase ventilation line has a leak if, during the comparison, the acquired measurement signal profile deviates from the expected measurement signal profile by at least a predetermined threshold value. In some examples, the predetermined threshold value may also be stored in the memory. Based on the comparison, it can accordingly be determined whether there is a leak in the crankcase ventilation line. If, for example, there is a leak in the crankcase ventilation line, the acquired measurement signal profile deviates significantly from the expected measurement signal profile, because the implemented influencing of the introduction of gas into the crankcase is not reflected in the measurement signal profile of the exhaust-gas sensor as expected. In some examples, a very simple and reliable leakage diagnosis of the crankcase ventilation line is possible. No additional components are required which would increase the costs of the internal combustion engine. Furthermore, very precise leakage diagnosis of the crankcase ventilation line is possible using components already existing or installed in the internal combustion engine. Overall, according to the described method, the leakage diagnosis of the crankcase ventilation line can be performed easily, rapidly and independently of additional components.

In some implementations, the crankcase aeration line has an aeration line valve, where the introduction of gas into the crankcase along the crankcase aeration line is influenced by the aeration line valve. The aeration line valve is, for example, a conventional air valve that is controlled in order to influence the supply of air or the introduction of gas into the crankcase. Accordingly, the gas mass flow or the fresh-air mass flow can be reduced, increased or completely stopped. The reduction, the increase or the complete closure/stoppage of the introduction of gas/of the supply of fresh air by the aeration line valve influences the introduction of gas into the crankcase. By way of the arrangement of the aeration line valve, a very easily implementable and precisely controllable possibility is accordingly created for influencing the introduction of gas along the crankcase along the crankcase aeration line into the crankcase in order to perform the leakage diagnosis of the crankcase ventilation line.

In some examples, in order to influence the introduction of gas into the crankcase along the crankcase aeration line, the aeration line valve is closed such that no gas can enter the crankcase along the crankcase aeration line. As a result of the complete closure of the aeration line valve, no further gas or fresh air is supplied to the crankcase through the crankcase aeration line, whereby the gas composition of the gas within the crankcase and the gas pressure within the crankcase are influenced. Both influences can be seen in the measurement signal profile of the exhaust-gas sensor and can accordingly be compared with the expected measurement signal profile based on the influence on the introduction of gas into the crankcase, whereby the leakage diagnosis of the crankcase ventilation line can be performed. The complete closure of the aeration line valve is accordingly a very effective way of influencing the introduction of gas into the crankcase, which in turn enables the leakage diagnosis to be performed reliably and rapidly.

In some examples, the internal combustion engine has a tank ventilation device which is fluidically connected to the crankcase aeration line by a tank ventilation valve, where gases are introduced from the tank ventilation device by the tank ventilation valve for the influencing of the introduction of gas into the crankcase. The tank ventilation device of the internal combustion engine is configured to collect gases, for example fuel gases, that are present in the tank of the internal combustion engine, and to discharge the gases from the tank. The gases from the tank ventilation device are conventionally supplied to the intake tract of the internal combustion engine, such that the gases can be used for the combustion in the internal combustion engine. The tank ventilation gases contain hydrocarbons, which can accordingly be burned in the internal combustion engine for the generation of torque. In some examples, gases from the tank ventilation device are supplied to the crankcase by the tank ventilation valve, whereby, in turn, combustible gases are additionally supplied to the intake tract through the crankcase aeration line, the crankcase and the crankcase ventilation line, which in turn influences the combustion within the internal combustion engine. The influence on the combustion can be determined in the exhaust gas of the internal combustion engine by the exhaust-gas sensor. It is for example conceivable that, for the leakage diagnosis, the tank ventilation device only supplies gases through the crankcase aeration line to the intake tract without directly supplying gases from the tank ventilation device to the intake tract. This ensures that gases from the tank are introduced exclusively through the crankcase aeration line for the influencing of the introduction of gas into the crankcase. Thus, the method is a reliable way of determining the leakage of the crankcase ventilation line, because a significant and easily measurable influence on the exhaust gas can be realized through the influencing of the introduction of gas by the tank ventilation device.

In some examples, the internal combustion engine has an exhaust-gas recirculation device which is fluidically connected to the crankcase aeration line by an exhaust-gas recirculation valve, where gases are introduced from the exhaust-gas recirculation device into the crankcase by the exhaust-gas recirculation valve for the influencing of the introduction of gas into the crankcase. The exhaust-gas recirculation device is configured to supply exhaust gases from the exhaust-gas tract of the internal combustion engine to the intake tract of the internal combustion engine and to conduct the exhaust gases through the combustion chamber of the internal combustion engine again. This allows emissions from the internal combustion engine to be reduced. In some examples, some or all of the gases from the exhaust-gas recirculation device can be supplied by the exhaust-gas recirculation valve to the crankcase aeration line. As a result, the exhaust gases flow along the crankcase aeration line, the crankcase and the crankcase ventilation line into the intake tract and accordingly influence the combustion in the combustion chamber of the internal combustion engine, which in turn influences one of the exhaust-gas properties as a result of the influencing of the introduction of gas into the crankcase, which can be acquired by the exhaust-gas sensor and used for the leakage diagnosis. It is likewise possible here, for the purposes of the leakage diagnosis, for all of the exhaust gas of the exhaust-gas recirculation device to flow through the crankcase aeration line without being supplied directly to the intake tract, but purely through the crankcase, whereby a particularly easily comparable leakage diagnosis can be performed. If the crankcase ventilation line has a leak, the exhaust gas conducted through the crankcase flows out of the leak in the crankcase ventilation line and is accordingly not supplied to the intake tract, whereby a deviation of the acquired measurement signal profile from the expected measurement signal profile can be identified, whereby it is in turn identified that the crankcase ventilation line has a leak. By virtue of the fact that the exhaust gas the exhaust-gas guidance through the crankcase and the supply of the exhaust gas through into the intake tract, the method represents a significant comparable variable of the influencing of the combustion, whereby reliable and precise leakage diagnosis of the crankcase ventilation line can be performed.

In some implementations, the exhaust-gas sensor is the lambda probe or one of the lambda probes of the exhaust-gas tract of the internal combustion engine. The acquired measurement signal profile of the exhaust-gas sensor, the lambda probe, is accordingly characteristic of a residual oxygen content in the exhaust gas. In addition, according to this example, the expected measurement signal profile is characteristic of the expected residual oxygen content based on the influence on the introduction of gas into the crankcase. By virtue of the fact that, in some examples, fresh air is introduced into the crankcase through the crankcase aeration line, oxygen is present in the crankcase. In addition, oils and fuels evaporate in the crankcase, which in turn are supplied, together with the oxygen that is present, through the crankcase ventilation line to the intake tract of the internal combustion engine and thus the combustion chambers of the internal combustion engine for combustion. The influencing of the introduction of gas into the crankcase accordingly also influences the supply of the aforementioned gases, in particular of oxygen, whereby the combustion in the combustion chambers of the internal combustion engine is influenced. Accordingly, the residual oxygen content in the exhaust gas of the internal combustion engine is also influenced by the influencing of the introduction of gas into the crankcase, if the parameters of the combustion of the internal combustion engine remain unchanged. This influencing of the residual oxygen content can be acquired by the lambda probe as an acquired measurement signal profile, which in turn can be used with the expected measurement signal profile for the leakage diagnosis of the crankcase ventilation line. The lambda probe is a conventionally installed component of the exhaust-gas tract of the internal combustion engine and, according to this example, can additionally be used for the leakage diagnosis of the crankcase ventilation line. This in turn reduces the costs of the leakage diagnosis, because no additional components have to be installed for the leakage diagnosis of the crankcase ventilation line. In addition, according to this example, the leakage diagnosis can be performed particularly reliably and rapidly.

In some implementations, the crankcase ventilation device has a pressure sensor which is configured to acquire a pressure measurement signal profile which is characteristic of the pressure profile in the crankcase ventilation line. The pressure sensor can accordingly additionally be used for the leakage diagnosis of the crankcase ventilation line or for checking of the plausibility of the leakage diagnosis by the exhaust-gas sensor.

In some examples, the acquired pressure measurement signal profile is compared with a provided expected pressure measurement signal profile in order to perform an additional leakage diagnosis. Here, the expected pressure measurement signal profile corresponds to the expected pressure profile within the crankcase ventilation line due to the influencing of the introduction of gas along the crankcase aeration line into the crankcase. By virtue of the fact that the pressure sensor is arranged directly in the crankcase ventilation line, comparatively rapid leakage diagnosis can be performed. If, for example, the gas flow into the crankcase along the crankcase aeration line is shut off completely by the aeration line valve, this directly influences the pressure measurement signal profile that is acquired by the pressure sensor. If the crankcase ventilation line has a leak, the pressure within the crankcase ventilation line will not change as expected due to the influencing of the introduction of gas into the crankcase, such that it can be identified that a leak is present in the crankcase ventilation line. According to the present example, an additional, very rapid and precise leakage diagnosis of the crankcase ventilation line can be performed.

In some implementations, it is identified that the crankcase ventilation line has a leak if the acquired measurement signal profile or the acquired pressure measurement signal profile deviates from the expected measurement signal profile or from the expected pressure measurement signal profile by at least a predetermined threshold value. The predetermined threshold value can be stored in the memory of the control unit and used continuously to identify whether the crankcase ventilation line has a leak. The comparison in accordance with this example is a relatively simple and rapidly implementable method for identifying whether the crankcase ventilation line has a leak.

In some implementations, it can be displayed to a user of the internal combustion engine that the crankcase ventilation line has a leak if it is identified by the method according to the present disclosure that the crankcase ventilation line has a leak. In some examples, it can be displayed to a user the internal combustion engine that the crankcase ventilation line has a leak if the acquired measurement signal profile or the acquired pressure measurement signal profile deviates from the expected measurement signal profile or from the acquired expected pressure measurement signal profile by at least the predetermined threshold value.

Another aspect of the disclosure provides a device for leakage diagnosis of the crankcase ventilation line of the crankcase ventilation device for the internal combustion engine having a control unit which is configured to control an aforementioned method. The device may be the engine control unit. It is also conceivable that the device is part of the engine control unit or is installed as an additional control unit, for example in a vehicle with the internal combustion engine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
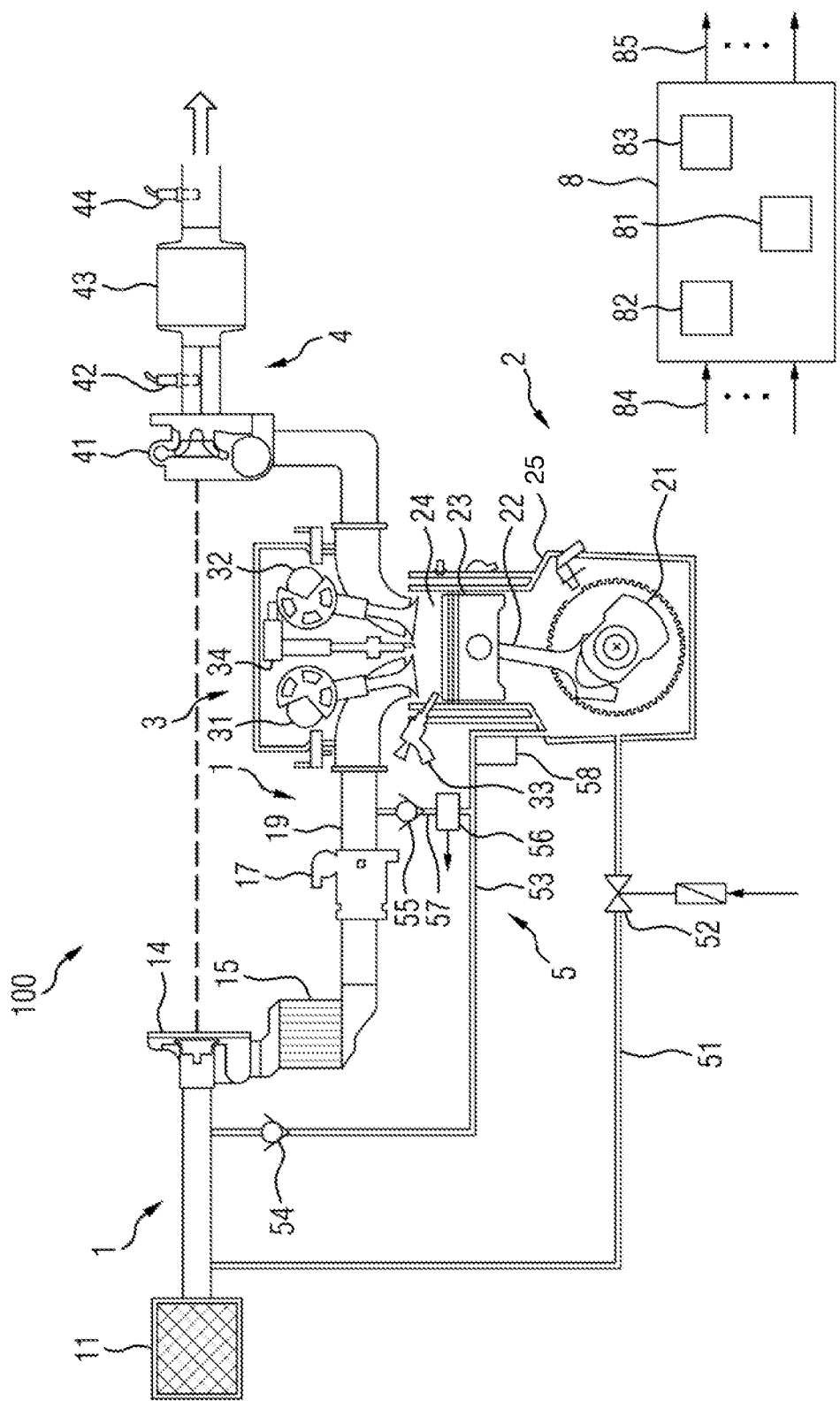
FIG. 1 is a schematic illustration of an exemplary internal combustion engine with an intake tract, an exhaust-gas tract and a crankcase ventilation device.

FIG. 1 shows, in a schematic illustration, an internal combustion engine 100 with an intake tract 1, an engine block 2, a cylinder head 3, an exhaust-gas tract 4, and a crankcase ventilation device 5. The intake tract 1 has an intake opening 11, an intake-air compressor 14, a charge-air cooler 15, a throttle flap 17, and an intake pipe 19. The intake opening 11 is configured to draw air into the intake tract 1 from the environment. The intake-air compressor 14 of the intake tract 1 is configured to compress the air drawn in through the intake opening 11. The charge-air cooler 15 is configured to cool the air compressed by the intake-air compressor 14. The throttle flap 17 of the intake tract 1 is configured to control an amount of air supplied to a combustion chamber 24 of the internal combustion engine 100. The intake pipe 19 is configured to supply the air to the combustion chamber 24.

The engine block 2 of the internal combustion engine 100 has a crankshaft 21, a connecting rod 22, a piston 23, the combustion chamber 24, and the crankcase 25. The combustion chamber 24 is formed by the engine block 2, the piston 23 and the cylinder head 3 and serves as a space in which the combustion of the internal combustion engine 100 takes place. The expansion of the gas in the combustion chamber 24 resulting from the combustion of the air/fuel mixture in the combustion chamber 24 is transmitted by the piston 23 and the connecting rod 22 to the crankshaft 21 as a rotational movement, whereby the chemical energy bound in the fuel-air mixture is converted into kinetic energy by the internal combustion engine 100.

The cylinder head 3 has a first gas inlet valve drive 31, a second gas inlet valve drive 32, at least one fuel injector 33 and at least one ignition plug 34. The gas inlet valve drives 31, 32 are configured to supply gas from the intake tract to the combustion chamber and to supply exhaust gas from the combustion chamber to the exhaust-gas tract 4. The fuel injector 33 is configured to inject fuel into the combustion chamber 24. The ignition plug 34 is configured to ignite the air-fuel mixture arranged in the combustion chamber 24.

The exhaust-gas tract 4 has an exhaust-gas turbine 41, a first exhaust-gas sensor 42, an exhaust-gas catalytic converter 43, and a second exhaust-gas sensor 44. The exhaust-gas turbine 41 drives the intake-air compressor 14 by a shaft.

The first exhaust-gas sensor 42 is arranged between the exhaust-gas turbine 41 and the exhaust-gas catalytic converter 43. In some examples, the first exhaust-gas sensor 42 may be one of the lambda probe(s) of the internal combustion engine 100. The exhaust-gas catalytic converter 43 is configured to reduce and bind pollutants in the exhaust gas. The second exhaust-gas sensor 44 is arranged downstream of the exhaust-gas catalytic converter 43. In some examples, the second exhaust-gas sensor 44 may be one of the lambda probe(s) of the internal combustion engine 100. The first exhaust-gas sensor 42 and/or the second exhaust-gas sensor 44 may be configured to acquire an exhaust-gas property of the exhaust gas such as, for example, a residual oxygen content, a temperature and a pressure or a chemical composition of the exhaust gas. The measurement signals/measurement signal profiles acquired by the exhaust-gas sensors 42, 44 can be supplied to a control unit 8 for evaluation.

The crankcase ventilation device 5 has a crankcase aeration line 51, an aeration line valve 52, a crankcase ventilation line 53, a first pressure control valve 54, a second pressure control valve 55, a pressure sensor 56, an intake pipe connection line 57, and an oil separator 58. The crankcase aeration line 51 is configured to supply fresh air from the intake opening 11 of the intake tract 1 to the crankcase 25. The aeration line valve 52 is configured to influence, for example completely shut off, the supply of fresh air and the introduction of gas into the crankcase 25. The aeration line valve 53 may for example be actuated in this regard by the control unit 8. The crankcase ventilation line 53 is configured to supply gases from the crankcase 25 to the intake tract 1, for example between the intake opening 11 and the intake-air compressor 14, or to the intake pipe 19. The first pressure control valve 54 is arranged in the crankcase ventilation line 53 and is configured to allow the introduction of gas into the intake tract 1 between the intake opening 11 and the intake-air compressor 14 only when a predetermined pressure prevails in the crankcase ventilation line 53. The second pressure control valve 55 is configured to feed gases from the crankcase ventilation line 53 to the intake pipe 19 only when the pressure within the crankcase ventilation line 53 exceeds a predetermined threshold value. The pressure sensor 56 is configured to detect a pressure measurement signal profile that is characteristic of the pressure within the crankcase ventilation line 53. The pressure measurement signal profile acquired by the pressure sensor 56 can be made available to the control unit 8 for evaluation. As shown in FIG. 1, the crankcase ventilation device 5 has an intake pipe connection line 57 which connects the crankcase ventilation line 53 to the intake pipe 19 of the internal combustion engine 100 and allows an introduction of gas into the intake pipe 19 along the crankcase ventilation line 53 through the second pressure control valve 55. The crankcase ventilation device 5 additionally has an oil separator 58, which is configured to separate off oil that has accumulated in the gases of the crankcase 25 that are to be ventilated, such that these oils or oil particles are not supplied to the intake tract 1 and thus to the combustion chamber 24 of the internal combustion engine 100. The internal combustion engine 100 additionally has the control unit 8, which has a processing unit 81, a program data memory 82 and a fault memory 83. The control unit 8 is configured to carry out the method for leakage diagnosis according to the present disclosure and accordingly to determine whether the crankcase ventilation line 53 has a leak. Accordingly, the calculations/comparisons to be performed can be performed in the processing unit 81 of the control unit 8. The programs and data required for the method to be carried out can be stored in the program memory/data memory 82 of the control unit 8. Any faults that occur, or if it is identified that the crankcase ventilation line 53 has a leak, can be stored in the fault memory 83 of the control unit. It is additionally conceivable that one of the faults is displayed to a user of the internal combustion engine by a fault display device. System inputs 84 that are supplied to control unit 8 and system outputs 85 that are output by the control unit to the internal combustion engine are illustrated schematically in FIG. 1. The system inputs 84 may for example be data from the exhaust-gas sensors 42, 44, parameters of the internal combustion engine or data from the pressure sensor 56 of the tank ventilation device 6. The system outputs 85 may for example be control commands to the aeration line valve 52 or to other components of the internal combustion engine 100.

Figure 2:
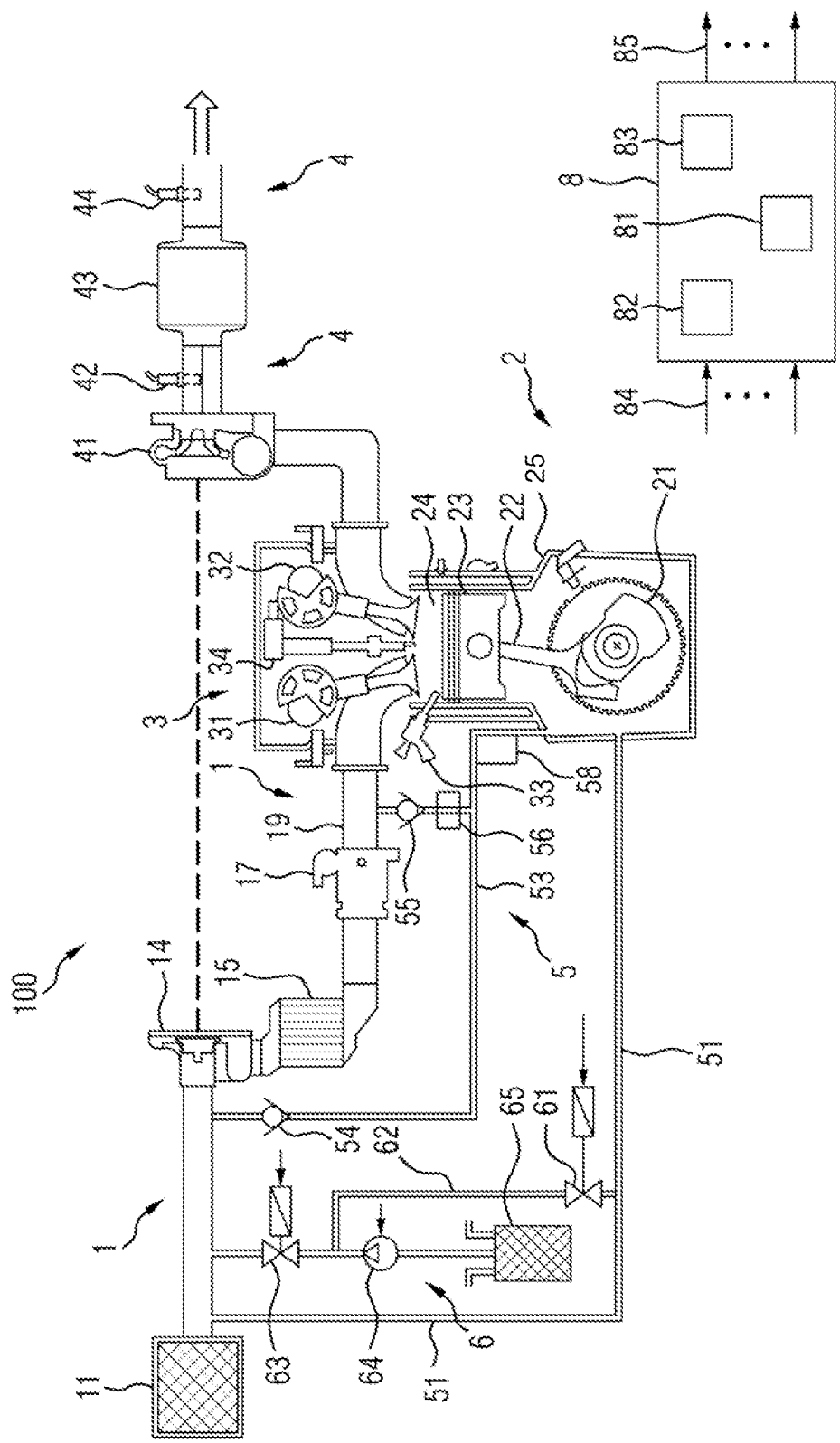
FIG. 2 is a schematic illustration of an exemplary internal combustion engine with an intake tract, an exhaust-gas tract and a crankcase ventilation device.

FIG. 2 shows, in a schematic illustration, another example of the internal combustion engine 100, which has a tank ventilation device 6. The tank ventilation device 6 has a tank ventilation valve 61 to the crankcase aeration line 51, a tank ventilation line 62, and a tank ventilation valve 63 to the intake tract 1. The tank ventilation device 6 additionally has a tank ventilation shut-off valve 64 for controlling the tank ventilation, and a tank 65. The tank ventilation valve 61 to the crankcase aeration line 51 is configured to control the introduction of the gases from the tank ventilation device 6 and the tank ventilation line 62 into the crankcase aeration line 51. The tank ventilation valve 63 to the intake tract 1 is configured to control the introduction of gases from the tank ventilation device 6 directly into the intake tract 1. By way of the arrangement of the tank ventilation line 62 and of the tank ventilation valve 61, gases from the tank ventilation system 6 can be supplied to the crankcase aeration line 51 in order to influence the introduction of gases into the crankcase 25. The tank ventilation valve 61, the tank ventilation valve 63 and the tank ventilation shut-off valve 64 can be actuated for example by the control unit 8 for the control of the introduction of the gases into the intake tract 1 or for the control of the introduction of the gases into the crankcase aeration line 51.

Figure 3:
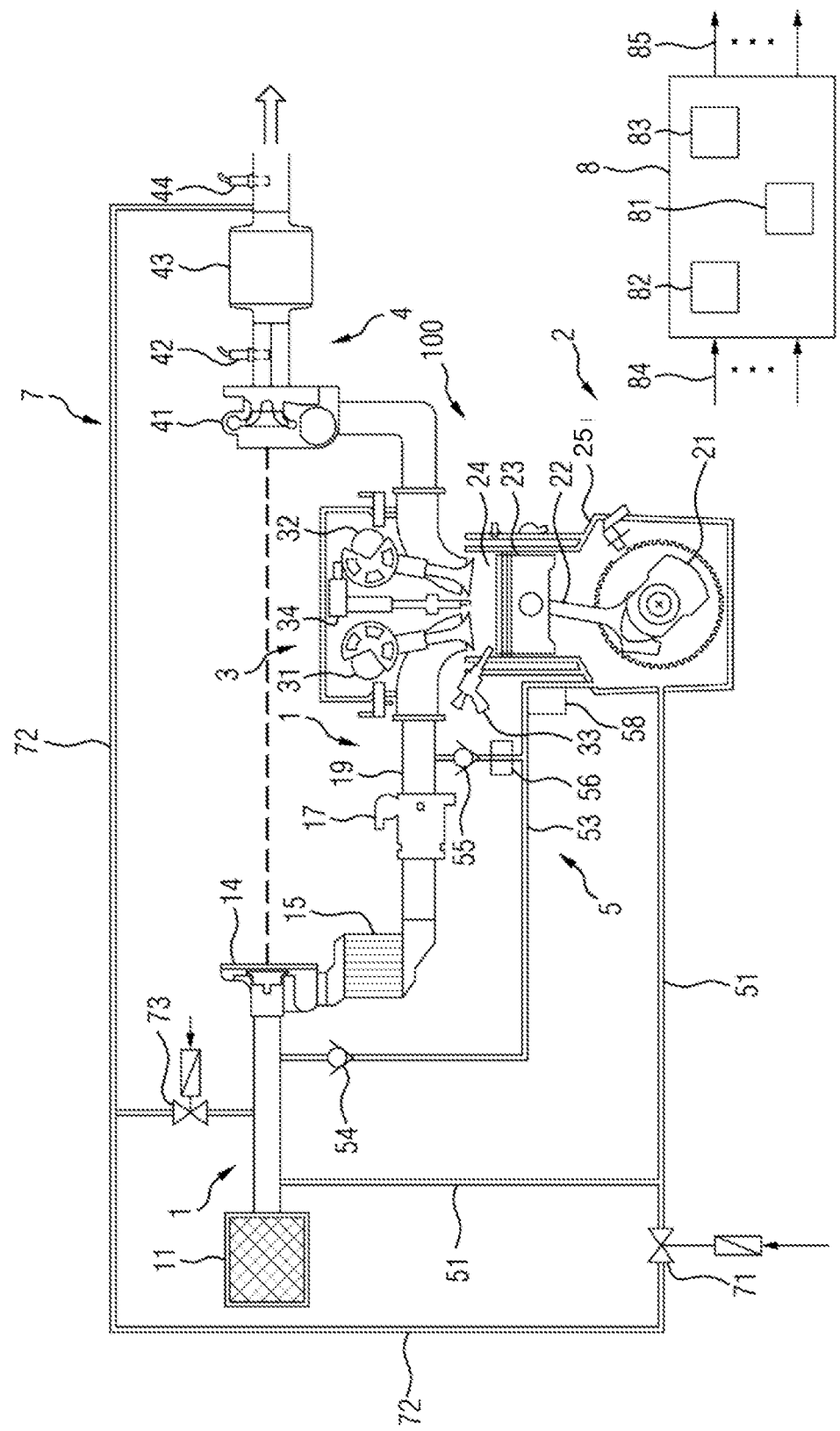
FIG. 3 is a schematic illustration of an exemplary internal combustion engine with an intake tract, an exhaust-gas tract and a crankcase ventilation device.

FIG. 3 shows, in a schematic illustration, another example of the internal combustion engine 100, where the internal combustion engine 100 has an exhaust-gas recirculation device 7. The exhaust-gas recirculation device 7 has an exhaust-gas recirculation valve 71 to the crankcase aeration line 51, an exhaust-gas recirculation line 72, and an exhaust-gas recirculation valve 73 to the intake tract 1. By way of the exhaust-gas recirculation device 7, exhaust gases from the exhaust-gas tract can be supplied along the exhaust-gas recirculation line 72 on the one hand directly into the intake tract 1 by the exhaust-gas recirculation valve 73, and on the other hand exhaust gases can be supplied directly to the crankcase aeration line 51 by the exhaust-gas recirculation valve 71 to the crankcase aeration line 51 in order to influence the introduction of gases into the crankcase 25 of the internal combustion engine 100. The exhaust-gas recirculation valve 71 and the exhaust-gas recirculation valve 73 can each be actuated by the control unit 8 for the selective or specific introduction of exhaust gases into the intake tract 1 or into the crankcase aeration line 51, whereby the introduction of gas into the crankcase 25 can be influenced.

A number of implementations have been described. Nevertheless, it will be understood that various modifications may be made without departing from the spirit and scope of the disclosure. Accordingly, other implementations are within the scope of the following claims.

What is claimed is:

1. A method for leakage diagnosis of a crankcase ventilation line of a crankcase ventilation device for an internal combustion engine, the method comprises:
    influencing the introduction of gas along a crankcase aeration line into a crankcase of the internal combustion engine;
    acquiring a measurement signal profile by an exhaust-gas sensor arranged in an exhaust-gas tract of the internal combustion engine, the measurement signal profile is characteristic of at least one exhaust-gas property of the exhaust gas in the exhaust-gas tract, the exhaust-gas property influenced by the influencing of the introduction of gas into the crankcase;
    providing an expected measurement signal profile characteristic of the exhaust-gas property of the exhaust gas in the exhaust-gas tract based on the influence of the introduction of gas into the crankcase;
    comparing the acquired measurement signal profile with the expected measurement signal profile; and
    identifying a leak in the crankcase ventilation line when, based on the comparison, the acquired measurement signal profile deviates from the expected measurement signal profile by at least a predetermined threshold value, the crankcase ventilation line discharging gases from the crankcase into the intake tract of the internal combustion engine,
    wherein the internal combustion engine has a tank ventilation device which is fluidically connected to the crankcase aeration line by a tank ventilation valve, wherein gases are introduced from the tank ventilation device by the tank ventilation valve for the influencing of the introduction of gas into the crankcase, or
    wherein the internal combustion engine has an exhaust-gas recirculation device which is fluidically connected to the crankcase aeration line by an exhaust-gas recirculation valve, wherein gases are introduced from the exhaust-gas recirculation device into the crankcase by the exhaust-gas recirculation valve for the influencing of the introduction of gas into the crankcase.

2. The method of claim 1, wherein the crankcase aeration line has an aeration line valve, wherein the introduction of gas into the crankcase is influenced by the aeration line valve.

3. The method of claim 2, wherein, in order to influence the introduction of gas into the crankcase, the aeration line valve is closed such that no gas can enter the crankcase along the crankcase aeration line.

4. The method of claim 1, wherein the exhaust-gas sensor is a lambda probe of the internal combustion engine, wherein the acquired measurement signal profile is characteristic of a residual oxygen content in the exhaust gas, and wherein the expected measurement signal profile is characteristic of an expected residual oxygen content based on the influencing of the introduction of gas into the crankcase.

5. The method of claim 1, wherein the crankcase ventilation device has a pressure sensor acquiring a pressure measurement signal profile which is characteristic of the pressure profile in the crankcase ventilation line.

6. The method of claim 5, wherein the acquired pressure measurement signal profile is compared with a provided expected pressure measurement signal profile, and it is identified that a leak is present if, during the comparison, the acquired pressure measurement signal profile deviates from the expected pressure measurement signal profile by at least a further predetermined threshold value.

7. A device for leakage diagnosis of a crankcase ventilation line of a crankcase ventilation device for an internal combustion engine, the device comprises:
- a control unit configured to control a method, the method comprising:
    - influencing the introduction of gas along a crankcase aeration line into a crankcase of the internal combustion engine;
    - acquiring a measurement signal profile by an exhaust-gas sensor arranged in an exhaust-gas tract of the internal combustion engine, the measurement signal profile is characteristic of at least one exhaust-gas property of the exhaust gas in the exhaust-gas tract, the exhaust-gas property influenced by the influencing of the introduction of gas into the crankcase;
    - providing an expected measurement signal profile characteristic of the exhaust-gas property of the exhaust gas in the exhaust-gas tract based on the influence of the introduction of gas into the crankcase;
    - comparing the acquired measurement signal profile with the expected measurement signal profile; and
    - identifying a leak in the crankcase ventilation line when, based on the comparison, the acquired measurement signal profile deviates from the expected measurement signal profile by at least a predetermined threshold value, the crankcase ventilation line discharging gases from the crankcase into the intake tract of the internal combustion engine,
- wherein the internal combustion engine has a tank ventilation device which is fluidically connected to the crankcase aeration line by a tank ventilation valve, wherein gases are introduced from the tank ventilation device by the tank ventilation valve for the influencing of the introduction of gas into the crankcase, or
- wherein the internal combustion engine has an exhaust-gas recirculation device which is fluidically connected to the crankcase aeration line by an exhaust-gas recirculation valve, wherein gases are introduced from the exhaust-gas recirculation device into the crankcase by the exhaust-gas recirculation valve for the influencing of the introduction of gas into the crankcase.

8. The device of claim 7, wherein the crankcase aeration line has an aeration line valve, wherein the introduction of gas into the crankcase is influenced by the aeration line valve.

9. The device of claim 8, wherein, in order to influence the introduction of gas into the crankcase, the aeration line valve is closed such that no gas can enter the crankcase along the crankcase aeration line.

10. The device of claim 7, wherein the exhaust-gas sensor is a lambda probe of the internal combustion engine, wherein the acquired measurement signal profile is characteristic of a residual oxygen content in the exhaust gas, and wherein the expected measurement signal profile is characteristic of an expected residual oxygen content based on the influencing of the introduction of gas into the crankcase.

11. The device of claim 7, wherein the crankcase ventilation device has a pressure sensor acquiring a pressure measurement signal profile which is characteristic of the pressure profile in the crankcase ventilation line.

12. The device of claim 11, wherein the acquired pressure measurement signal profile is compared with a provided expected pressure measurement signal profile, and it is identified that a leak is present if, during the comparison, the acquired pressure measurement signal profile deviates from the expected pressure measurement signal profile by at least a further predetermined threshold value.

* * * * *